US012511595B2

(12) United States Patent
McCarthy et al.

(10) Patent No.: US 12,511,595 B2
(45) Date of Patent: Dec. 30, 2025

(54) CYBERSECURITY OPERATIONS CENTER LOAD BALANCING

(71) Applicant: Arctic Wolf Networks, Inc., Eden Prairie, MN (US)

(72) Inventors: Joshua McCarthy, Morgan Hill, CA (US); David B McKinley, Dartmouth, MA (US); Lance Rund, San Jose, CA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 150 days.

(21) Appl. No.: 18/207,714

(22) Filed: Jun. 9, 2023

(65) Prior Publication Data

US 2023/0334388 A1 Oct. 19, 2023

Related U.S. Application Data

(63) Continuation-in-part of application No. 17/825,024, filed on May 26, 2022.
(Continued)

(51) Int. Cl.
*G06Q 10/00* (2023.01)
*G06Q 10/0631* (2023.01)
*G06Q 10/0639* (2023.01)

(52) U.S. Cl.
CPC ............ *G06Q 10/063112* (2013.01); *G06Q 10/06398* (2013.01)

(58) Field of Classification Search
None
See application file for complete search history.

(56) References Cited

U.S. PATENT DOCUMENTS

| 8,392,218 B2 | 3/2013 | Becker et al. |
| 10,534,971 B2 | 1/2020 | Huber, Jr. et al. |

(Continued)

FOREIGN PATENT DOCUMENTS

KR 10-2020-0083874 A 7/2020

OTHER PUBLICATIONS

N. Miloslavskaya, "Security Operations Centers for Information Security Incident Management," 2016 IEEE 4th International Conference on Future Internet of Things and Cloud (FiCloud), Vienna, Austria, 2016, pp. 131-136 (Year: 2016).*

(Continued)

*Primary Examiner* — Matheus Ribeiro Stivaletti
(74) *Attorney, Agent, or Firm* — Barnes & Thornburg LLP

(57) ABSTRACT

Disclosed techniques include cybersecurity operations center load balancing. A cybersecurity security operations center (SOC) caseload history is accessed. Triage results from the SOC caseload history are analyzed on a computer platform to produce an analyst threat response profile. The analyst threat response profile is augmented with threat response resolution metrics. The threat response resolution metrics are updated with a subjective rating. The subjective rating is supplied by management, peers, or machine learning. Notification of a new cybersecurity threat is received across a cybersecurity network by the SOC. The new cybersecurity threat is assigned to a specific analyst, based on the augmented analyst threat response profile. The assigning is further based on weighting of threat severity, threat complexity, and analyst availability. An existing SOC caseload is reassigned to increase availability of the specific analyst.

24 Claims, 8 Drawing Sheets

Related U.S. Application Data

(60) Provisional application No. 63/471,278, filed on Jun. 6, 2023, provisional application No. 63/451,249, filed on Mar. 10, 2023, provisional application No. 63/404,983, filed on Sep. 9, 2022, provisional application No. 63/350,891, filed on Jun. 10, 2022, provisional application No. 63/327,853, filed on Apr. 6, 2022, provisional application No. 63/297,273, filed on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | | |
|---|---|---|---|
| 10,621,172 | B2 | 4/2020 | Azaria et al. |
| 10,776,316 | B2 | 9/2020 | Baggeroer et al. |
| 10,838,709 | B2 | 11/2020 | Eapen et al. |
| 10,901,863 | B2 | 1/2021 | Lukkoor et al. |
| 10,922,452 | B2 | 2/2021 | Liu et al. |
| 10,924,527 | B2 | 2/2021 | Miller |
| 10,936,234 | B2 | 3/2021 | Su |
| 10,938,706 | B1 | 3/2021 | Zacks et al. |
| 10,938,951 | B2 | 3/2021 | White et al. |
| 10,956,880 | B2 | 3/2021 | Towle |
| 10,986,117 | B1 * | 4/2021 | Agbabian ............ G06F 21/6218 |
| 11,916,929 | B1 * | 2/2024 | Thimmegowda ... H04L 63/1425 |
| 2013/0318542 | A1 | 11/2013 | Zamora |
| 2015/0026810 | A1 | 1/2015 | Friedrichs et al. |
| 2018/0039526 | A1 * | 2/2018 | Mulla ............... G06Q 10/06312 |
| 2018/0121316 | A1 | 5/2018 | Ismael et al. |
| 2019/0297118 | A1 * | 9/2019 | Haugsnes ............ H04L 63/1441 |
| 2020/0244412 | A1 | 7/2020 | Kalhan |
| 2020/0280443 | A1 | 9/2020 | Simons |
| 2020/0305011 | A1 | 9/2020 | Yaniv et al. |
| 2020/0342552 | A1 | 10/2020 | Sulit et al. |
| 2020/0363781 | A1 | 11/2020 | Mangels et al. |
| 2020/0380006 | A1 | 12/2020 | Rockwell et al. |
| 2021/0014153 | A1 | 1/2021 | Amend et al. |
| 2021/0042589 | A1 | 2/2021 | Tokarev Sela et al. |
| 2021/0070333 | A1 | 3/2021 | Chen |
| 2021/0099420 | A1 | 4/2021 | Zhang |
| 2021/0158246 | A1 * | 5/2021 | Pratt ................. G06Q 10/06312 |
| 2023/0025208 | A1 * | 1/2023 | Jinno .................. H04L 63/1433 |
| 2023/0136457 | A1 * | 5/2023 | Patel ................. G06Q 10/06398 705/4 |
| 2023/0196244 | A1 * | 6/2023 | Datta Ray .......... G06Q 10/0635 705/7.29 |

OTHER PUBLICATIONS

Sangani, Nilaykumar Kiran, and Haroot Zarger. "Machine learning in application security." Advances in Security in Computing and Communications. IntechOpen, 2017.

Boutaba, Raouf, et al. "A comprehensive survey on maching learning for networking: evolution, applications and research opportunities." Journal of Internet Services and Applications 9.1 (2018): 1-99.

International Search Report dated Aug. 31, 2022 for PCT 2022/031003.

* cited by examiner

CYBERSECURITY OPERATIONS CENTER LOAD BALANCING

RELATED APPLICATIONS

This application claims the benefit of U.S. provisional patent applications "Cybersecurity Operations Center Load Balancing" Ser. No. 63/350,891, filed Jun. 10, 2022, "Cybersecurity Operations Case Triage Groupings" Ser. No. 63/404,983, filed Sep. 9, 2022, "Cybersecurity Operations Mitigation Management" Ser. No. 63/451,249, filed Mar. 10, 2023, and "Cybersecurity AI-Driven Workflow Generation Using Policies" Ser. No. 63/471,278, filed Jun. 6, 2023.

This application is also a continuation-in-part of U.S. patent application "Cybersecurity Threat Management Using Element Mapping" Ser. No. 17/825,024, filed May 26, 2022, which claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to cybersecurity operations center load balancing.

BACKGROUND

In the early days of computers, security was a relatively simple issue. Computers were large, sometimes filling entire rooms. They had specialized power and environmental requirements. Programming and operating a computer required direct physical access. In many cases, a computer could only execute one program at a time and required a dedicated operator to feed the program into the computer, execute the program, and receive the run results. The ability to use the computer was limited to those with specialized knowledge of computers or mathematics. Someone wanting to do harm to the computer itself or use the computer for illegitimate or illegal purposes required physical access, and the ability to program and operate the computer. Security, therefore, was focused on maintaining the computer components, sustaining the environment required to run them, and controlling access to the computer.

As the capabilities of computer systems advanced, the ability to run programs more quickly and easily grew. Programs could be input using punch cards, punch tapes, and magnetic tapes and could be fed into the computers more quickly and accurately. Advances in computing power, memory, and storage created a situation in which the time to execute a program was significantly smaller than the time required to prepare the program to run. This led to the development of time sharing and multiple user access points. Computer operating systems, and memory and storage management matured to the point where groups of users could work on a computer at the same time. The computer moved from one user to the next in turn, executing their programs, storage requests, and so on. Users of the computer could type in commands and programs using specialized keyboards, punch tape, or card readers. Eventually, monochrome cathode ray tube (CRT) displays in green or amber replaced rolls of paper, allowing the users to see what they typed as well as the responses from the computer system. Computer security became somewhat more complicated as user access points or terminals spread out across buildings. However, physical wiring was still necessary to access the computer. Security was still confined primarily to protecting the computer system components and the physical environment of the computer, and controlling access to the user terminals. Operating systems added usernames and passwords to ensure that those using the computer were authorized to do so. As the number of computer users increased, and the amount of specialized knowledge required to interact with computer systems decreased, more attention was paid to ensuring that the computer users were performing their duties correctly and appropriately.

With the advent of the Internet, personal computers, and wireless networks, the need for computer security has exploded. Within a very few years, users with no background in computer science or even a basic understanding of computer systems have gained access to huge amounts of data and processing power. Cellphones, tablets, pads, and home game platforms can now be used to access multiple computers simultaneously, in many cases represented by a simple web server platform. Advances in telecommunications have rendered a situation in which users from across the globe can access systems anonymously or nearly so. Unfortunately, as computing power and access has grown, cybercrime has grown as well. Financial systems can be compromised; individual users, families, and small business can be exploited; infrastructure systems can be wrecked; and public and private information can be stolen. As the number and types of malicious and accidental security breaches have grown, so our collective need for cybersecurity has mushroomed. As our reliance on computer systems of all types increases, businesses, governments, and individual users will continue to face computer security challenges for many years to come.

SUMMARY

The continuous and reliable operation of computing infrastructure is mission critical to organizations of all sizes. In fact, the organizational operations are inexorably linked to the computing infrastructure. Continuous computing operations are enabled by effective detection, management, and mitigation of cybersecurity threats of all types. The organizations that are impacted by cybersecurity threats include businesses, financial institutions, hospitals, government agencies, retailers, universities, schools, and so on. All of these organizations are acutely aware of myriad and diverse cybersecurity threats that are launched against them. They actively configure, implement, and deploy state-of-the art cybersecurity hardware and software to secure their information technology (IT) infrastructure against the threats. While preventive measures, such as installing updates to application and operating systems software, former user deactivation, security checkups, and other housekeeping activities are common to successful IT operations, these measures alone are inadequate to provide comprehensive IT infrastructure protection. The cybersecurity threats evolve rapidly and are becoming significantly more sophisticated. Thus, constant system-wide vigilance and anticipatory action are demanded. Nearly as soon as a cybersecurity solution is found that identifies, responds to, and eradicates a threat such as a virus; thwarts a Trojan horse program; or detects and deletes a phishing attack; the malefactors behind the cybersecurity attacks adapt their techniques by using new attack vectors; advanced social engineering ploys; hacking; data theft; and many other deceptive, malicious, and illegal techniques.

Disclosed techniques enable cybersecurity operations center load balancing. A cybersecurity security operations center (SOC) caseload history is accessed. The caseload history can include cybersecurity threat types and frequencies, assigned analysts, threat response outcomes, and so on. A computer platform is used to analyze triage results from the SOC caseload history to produce an analyst threat response profile. The triage results can include an analysis of threat severity and threat complexity. Based on the threat severity and complexity, the triage results can be matched with analyst availability. The threat response profile can be associated with an analyst. The analyst threat response profile is augmented with threat response resolution metrics. The threat resolution metrics can include an initial response time, a closure response time, and a peer interaction metric. The threat response resolution metrics can be updated with a subjective rating. The subjective rating can be supplied by management, peers, or machine learning. Notification is received across a cybersecurity network of a new cybersecurity threat by the SOC. The new cybersecurity threat can include a new instance of a known threat, a new type of previously unseen threat, and the like. The new cybersecurity threat is assigned to a specific analyst, based on the analyst threat response profile that was augmented. The assigning can be further based on a weighting of threat severity, threat complexity, and analyst availability. If the analyst best suited to addressing the new cybersecurity threat is unavailable, the existing SOC caseload can be reassigned to increase availability of the specific analyst.

On any given day, a security operations center associated with an organization will receive notifications resulting from detection of a significant number of cybersecurity attacks. The notifications are processed or triaged for the severities of the threats, the complexities associated with handling the threats, and the availability of analysts who are well suited to addressing the cybersecurity threats. Response to a cybersecurity threat can include steps, techniques, procedures, codes, applications, and so on for detecting the extent of the cybersecurity threats and for mitigating those detected threats. These responses are undertaken by the cybersecurity threat analyst to whom the cybersecurity threat is assigned. As the number of notifications increases, the caseloads of the analysts also increase. As a result, an analyst best suited to handling an unassigned cybersecurity threat may already be handling a heavy or full caseload. To ameliorate such issues, one or more cases associated with the caseload of the analyst can be reassigned to other analysts, thereby making the analyst available to handle the notification that they are best suited to address. The notification reassignments and the "best fit" assignment tasks can be automated.

A security operations center caseload history can be analyzed to produce a threat response profile for an analyst. Threat response resolution metrics, which can include an initial response time, a closure response time, and a peer interaction metric, can be used to augment the threat response profile. The threat response resolution metrics can be updated with a subjective rating, where the subjective rating can be supplied by management, peers, or machine learning. The assigning of new cybersecurity threats can be based on a weighting of threat severity, threat complexity, and analyst availability. In order to ameliorate a current caseload of an analyst best suited to handling a newly detected cybersecurity threat, an existing SOC caseload can be reassigned to increase availability of a specific analyst. Common cybersecurity resolution deficiencies can be identified based on aggregation of the threat response resolution metrics. A pedagogy plan can be developed for one or more analysts, within a cohort of analysts staffing the SOC, based on the analyst threat response profile that was augmented. The pedagogy plan is developed using a machine learning algorithm.

A computer-implemented method for cybersecurity management is disclosed comprising: accessing a cybersecurity security operations center (SOC) caseload history; analyzing, on a computer platform, triage results from the SOC caseload history to produce an analyst threat response profile; augmenting the analyst threat response profile with threat response resolution metrics; receiving, across a cybersecurity network, notification of a new cybersecurity threat by the SOC; and assigning the new cybersecurity threat to a specific analyst, based on the analyst threat response profile that was augmented. In embodiments, the threat response resolution metrics include an initial response time, a closure response time, and a peer interaction metric. Some embodiments comprise updating the threat response resolution metrics with a subjective rating. In embodiments, the assigning is further based on a weighting of threat severity, threat complexity, and analyst availability. Further, some embodiments comprise reassigning an existing SOC caseload to increase availability of the specific analyst.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
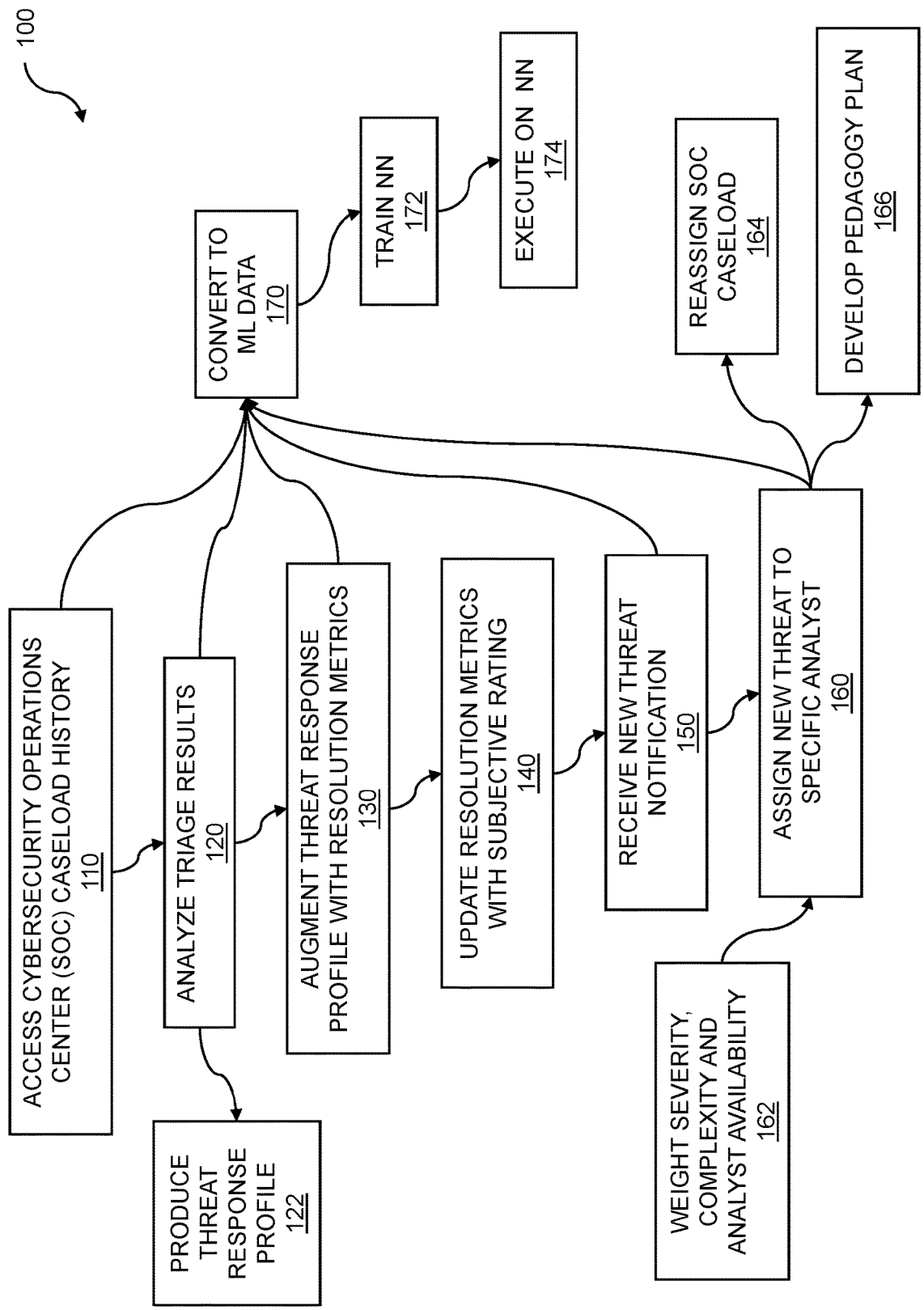
FIG. 1 is a flow diagram for cybersecurity operations center load balancing.

Hackers, spammers, and all manner of criminals, whether offshore or onshore, perpetrate sophisticated, frequent attacks on the information technology infrastructures of various enterprises. These malefactors include individual criminals, gangs, and organized crime; government sponsored and protected malefactors; terrorists and extortionists; among many others with malicious intent. Businesses, government agencies, hospitals, research laboratories, retailers, universities, and other enterprises and organizations are under constant attack. Cybersecurity threats such as cyber-attacks have been detected to occur as often as every few seconds. Enterprises from sectors such as high technology, retail, and government agencies including defense, air traffic control, and revenue are by far the most frequently targeted. These "big three" sectors are attacked because of the value of their data and their potential to execute large financial payouts. Other targets of high value include media companies who are claimed by cyber-attackers to have insulted a religion or humiliated national leaders, and national infrastructures such as fuel pipelines and energy grids. Small businesses and individuals are not immune from cybercriminal attacks, despite their diminutive sizes and relatively small potential payout capabilities. The smaller enterprises and the individuals are targets for small, quick payouts and for identity theft. Fuel and energy infrastructures are attacked because of the potential to cause both huge energy delivery disruptions and financial market chaos. Small enterprises in particular, which tend to have limited cybersecurity threat protection capabilities, have been willing to pay any amount they can to recover their business data from cybercriminals who have maliciously encrypted the enterprises' data. An individual may freely and unwittingly provide usernames and passwords associated with bank or brokerage accounts; and personal information such as telephone numbers, email addresses, physical addresses, age, gender, birthdate, national identification number, and so on to the cybercriminals without realizing they have been duped into doing so. Stolen personal information has been used to open bank accounts, obtain credit cards or loans, and perform other actions which can ruin the individual's financial wellbeing, credit score, and more. The individual may also drain their personal savings or run up substantial personal debt to transfer funds to what turns out to be an offshore financial institution, thinking they are providing aid to a friend or loved one in distress.

Enterprises large and small annually expend significant financial and human resources to protect themselves against cybersecurity threats. Cybersecurity activities, which include cybersecurity threat management, are designed to protect computing systems, data, networks, and other critical information technology (IT) infrastructure by detecting and countering cybersecurity threats as they arise. Each of the cybersecurity activities plays a pivotal role in securing enterprise-wide IT infrastructure and in ensuring safe and reliable computing operations. In addition, critical threat protections that are specific to the particular enterprise or the type of enterprise can be configured and deployed. These latter threat protections can include advanced techniques such as biometric verification, two-factor authentication, coded challenges and responses, encrypted or secured communications channels such as virtual private networks, and so on. The enterprises include public and private organizations that can be large, medium, and small in terms of numbers of employees, annual sales, numbers of locations, and the like. The enterprises can include businesses, hospitals, government agencies, research facilities, and universities, among many others. The enterprises are painfully aware that cybersecurity best practices are not merely desirable or "nice to have". Rather, implementing cybersecurity best practices is essential to the continued operation of, and indeed the survival of, the enterprises.

Cybersecurity, when executed correctly, integrates highly complex suites of tools and activities. However, proper cybersecurity implementation is extremely complicated and expensive. Further, the tasks associated with cybersecurity are constantly in flux. The cybersecurity measures taken by the enterprises today can detect and prevent known or recently discovered attack techniques, but the techniques used by cybercriminals are constantly evolving, and are specifically designed to thwart or circumvent the cybersecurity measures. Nearly as soon as a cybersecurity threat tool is developed for identifying, reacting to, and eradicating a cybersecurity threat such as a virus, a Trojan horse program, a phishing ploy, or a denial-of-service attack, the cybercriminals adapt their cyberthreat techniques. This results in an ever-escalating, high stakes cyber-game of cat and mouse. The cyberthreat adaptation targets popular electronic devices, uses new or recently discovered attack vectors, fine tunes and improves social engineering stratagems, and employs other foul deceptions. Purported links to scandalous and compromising photographs of famous people, earnest promises of shared wealth from deposed or exiled continental nobility, and desperate pleas for help from purported relatives and friends who are in serious legal or financial trouble while visiting distant locations are specifically designed by their perpetrators to induce a visceral reaction and to motivate their victims to react quickly and unthinkingly. Other deceits include completely copying the landing page of a website with which the victim is familiar. Unless the victim looks at the web address, they would be unaware of the deception until their personal information is stolen, or their bank accounts are emptied. Further subterfuges include "man-in-the-middle" attacks, where the communications between an unwitting victim and a legitimate website are monitored to harvest personal information, usernames and passwords, and other confidential information.

In disclosed techniques, cybersecurity management is accomplished based on cybersecurity operations center load balancing. A cybersecurity security operations center (SOC) caseload history is accessed. The caseload history includes cybersecurity threats detected, notifications generated, case assignments to analysts who are working to address the threats, and so on. A computer platform is used to analyze triage results from the SOC caseload history to produce an analyst threat response profile. The analyst threat response profile can include an analyst name, threat type, caseload, success rate, and the like. The analyst threat response profile is augmented with threat response resolution metrics. The threat response resolution metrics can include an initial response time, a closure response time, a peer interaction metric, etc. Notification of a new cybersecurity threat is received across a cybersecurity network by the SOC. The threat can include a hack, unauthorized access, anomalous infrastructure behavior, and so on. The new cybersecurity threat is assigned to a specific analyst, based on the analyst threat response profile that was augmented. If the caseload associated with the specific analyst is already full, then cases from the caseload can be reassigned, thereby supporting assignment of the new cybersecurity threat to the analyst best suited to address the threat.

FIG. 1 is a flow diagram for cybersecurity operations center load balancing. Cybersecurity management can be accomplished based on techniques associated with cybersecurity operations center load balancing. A cybersecurity security operations center (SOC) caseload history can be accessed. The SOC caseload history can include cybersecurity threat notifications received from a plurality of network-connected cybersecurity threat protection applications. The cybersecurity threats can include possible threats, known threats, confirmed threats, etc. The cybersecurity threats can be accompanied by an increase in a number of notifications. The notifications can include or represent an anomalous information technology (IT) infrastructure operation, detected threats and attacks, utilization of discovered vulnerabilities, and so on. The caseload history can further include a cohort of analysts that responded to the threats. A computer platform can be used to analyze triage results from the SOC caseload history to produce an analyst threat response profile. The profile can include an analyst name, experience level, courses completed, certificates earned, etc. The analyst threat response profile can be augmented with threat response resolution metrics. The threat response resolution metrics can include an initial response time, a closure response time, a peer interaction metric, etc. Notification of a new cybersecurity threat can be received across a cybersecurity network by the SOC. The cybersecurity threat can include a cybersecurity attack, anomalous behavior of one or more elements of an information technology infrastructure, and the like. The new cybersecurity threat can be assigned to a specific analyst based on the analyst threat response profile that was augmented. The analyst can include the analyst identified as best suited to manage the threat, an available analyst, and so on.

Analysis of the SOC caseload history is useful in identifying the severity and extent of cybersecurity threats, and the successes and deficiencies of the responses by analysts to the cybersecurity threats. The analyst threat response profiles that are produced by the analysis can be augmented with resolution metrics. The threat response metrics can include an initial response time, a closure response time, a peer interaction metric, a supervisor interaction metric, and so on. Based on the analysis of the SOC caseload history and identified deficiencies of analysts, a pedagogy plan can be developed for one or more analysts within a cohort of analysts staffing the SOC. The pedagogy plan can be based on augmented analyst threat response profiles. The pedagogy plan can be developed using a machine learning algorithm, where the machine learning algorithm can be trained to infer deficiencies identified by the caseload history analysis. The pedagogy plan can serve additional training purposes as well, such as broadening analyst capabilities by developing a plan for analyst generalization, improving skills by developing a plan for analyst specialization, etc. The flow 100 shows a computer-implemented method for cybersecurity management.

The flow 100 includes accessing 110 a cybersecurity security operations center (SOC) caseload history. The SOC caseload history can include a record of cybersecurity threat notifications that were received. The record can further include a list of the network-connected cybersecurity threat protection applications that generated the notifications, the analysts who staffed the SOC and responded to the notifications, and so on. A threat protection application can defend computer systems, data systems, data networks, endpoint devices, and so on against various types of malicious cyberattacks. The plurality of cybersecurity threat protection applications can include security information and event management (STEM) applications. More advanced techniques can also be applied. In embodiments, the plurality of cybersecurity threat protection applications can include security orchestration, automation, and response (SOAR) applications (further described below). The malicious cyberattacks can include malware attacks, hacking attacks, distributed denial of service attacks (DDoS), man-in-the-middle attacks, and so on. The applications can include antivirus, anti-phishing, and anti-cryptojacking applications; tools for threat hunting and threat intelligence; identity verification; endpoint protection; forensic investigation; incident management; and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on. The caseload history can further include cybersecurity threat severity, threat complexity, and the like. The caseload history can include the one or more analysts who were available to manage the cybersecurity threat notification.

The flow 100 includes analyzing, on a computer platform, triage results 120 from the SOC caseload history. The analyzing can include determining an efficacy of a cybersecurity threat response, response time, response outcomes, and so on. The analyzing can be performed using artificial intelligence (AI) techniques. The analyzing can be supplemented by analysis performed by cybersecurity threat response experts. In embodiments, the triage results can include an analysis of threat severity and threat complexity. The triage results can further include an extent of the threat, the IT infrastructure that was impacted by the threat, and the like. In embodiments, the triage results can be matched with analyst availability (discussed below). The flow 100 further includes producing an analyst threat response profile 122. The analyst threat response profile can include analyst name, experience level, training and courses completed, certifications earned, and so on. The threat response profile can include a threat response success rate.

The flow 100 includes augmenting 130 the analyst threat response profile with threat response resolution metrics. The metrics can be associated with cybersecurity threat response techniques, analysts who used the techniques to manage and counteract the cybersecurity threats, and so on. In embodiments, the threat response resolution metrics can include an initial response time, a closure response time, a peer interaction metric, and the like. The threat response metrics can be updated, modified, altered, etc., based on additional information received about cybersecurity threat responses. The flow 100 further includes updating 140 the threat response resolution metrics with a subjective rating. The subjective rating can be provided by various sources. In embodiments, the subjective rating can be supplied by management. An analyst's manager can supply a rating associated with the analyst, where the rating can include a value; a qualitative rating such as excellent, good, fair, or poor; a stack ranking compared to other analysts; etc. In other embodiments, the subjective rating can be supplied by peers. Other analysts within a cohort of analysts can rank each other, provide comments or constructive criticism, and the like. In further embodiments, the subjective rating can be supplied by machine learning. A machine learning algorithm can be used to evaluate an analyst, compare the analyst to other analysts within a cohort, and the like.

The flow 100 includes receiving, across a cybersecurity network, notification 150 of a new cybersecurity threat by the SOC. The notification can be received from an application within a plurality of network-connected cybersecurity threat protection applications. The cybersecurity applications can perform a variety of functions, detect various threat types, and so on. The plurality of network-connected cybersecurity threat protection applications can accomplish endpoint protection, anti-phishing and antivirus detection, firewall operation and maintenance, man-in-the-middle detection, denial of service and distributed denial of service detection, ransomware countermeasures, and the like.

The flow 100 includes assigning the new cybersecurity 160 threat to a specific analyst based on the analyst threat response profile that was augmented. The assignment to a specific analyst can be based on a best match between the threat response profile and the cybersecurity threat, the next available analyst, and so on. Other criteria, factors, and so on can be used for the assigning. In the flow 100, the assigning can be further based on a weighting 162 of threat severity, threat complexity, and analyst availability. The assignment can be based on analyst training level, threat response experience, etc. As new cybersecurity threats are assigned to specific analysts, the caseloads associated with the analysts can fill to a point where an analyst, whether best suited to address a cybersecurity threat or not, is not available for the assignment. The flow 100 further includes reassigning 164 an existing SOC caseload to increase availability of the specific analyst. The reassigning can be based on next best analyst, next available analyst, and the like. In embodiments, the reassigning can include a re-triage of existing SOC caseload. The re-triage of the caseload can be used to identify an analyst capable of managing a particular cybersecurity threat notification.

In embodiments, a subset cohort of analysts staffing the SOC can be grouped for additional caseload history analysis. The additional analysis can be indicated due to changing trends in threat response results, time-to-remediate, etc. In embodiments, the additional caseload history can be based on common resolution deficiencies. The common resolution deficiencies can be based on inexperience, lack of training, new cybersecurity threats, and so on. In embodiments, the common resolution deficiencies can be based on an aggregation of the threat response resolution metrics. The aggregation of the threat response resolution metrics can be used to identify deficiencies associated with a cohort of analysts rather than deficiencies associated with a single analyst. The flow 100 further includes developing 166 a pedagogy plan for one or more analysts, within a cohort of analysts staffing the SOC, based on the analyst threat response profile that was augmented. The pedagogy plan can be based on previously used plans, expert-provided plans, etc. In embodiments, the pedagogy plan can be developed using a machine learning algorithm. The machine learning algorithm can be trained to identify analyst cohort deficiencies, to select or generate a pedagogy plan, etc. The pedagogy plan can accomplish a variety of training goals. In embodiments, the pedagogy plan can be developed for analyst generalization. The analyst generalization can broaden capabilities with the cohort of analysts, enable analysts to provide backup for each other, and the like. In other embodiments, the pedagogy plan can be developed for analyst specialization. The analyst specialization can improve specific skills and can expand cohort threat response capabilities.

In the flow 100, the accessing, the analyzing, the augmenting, the receiving, and the assigning are converted 170 to machine learning training data. The training data includes the SOC caseload history and expected results or outcomes based on processing the caseload history. In a usage example, a cybersecurity threat notification indicating a virus within email messages can be received. The expected outcomes can include one or more of removing the virus from the email messages, blocking the sender of the messages, updating antivirus software, pushing antivirus software updates out to client computers and portable devices, etc. In embodiments, the accessing, the analyzing, the augmenting, the receiving, and the assigning can be managed by a security automation and response (SOAR) system. The flow 100 includes training 172 a neural network using the machine learning training data. Discussed below, the training of the neural network can include providing training data to the neural network, observing inferences formed by the neural network, adjusting weights associated with nodes within the neural network, and so on. The observing and adjusting can continue until the neural network is able to form the expected inferences for the training data provided. The flow 100 further includes executing 174 the receiving and the assigning on the neural network that was trained. The neural network can continue to "learn" based on processing of data other than training data. The learning can be accomplished by the network to improve convergence speed, inference accuracy, etc.

Various embodiments of the flow 100 can be included in a computer program product embodied in a non-transitory computer readable medium that includes code executable by one or more processors.

Figure 2:
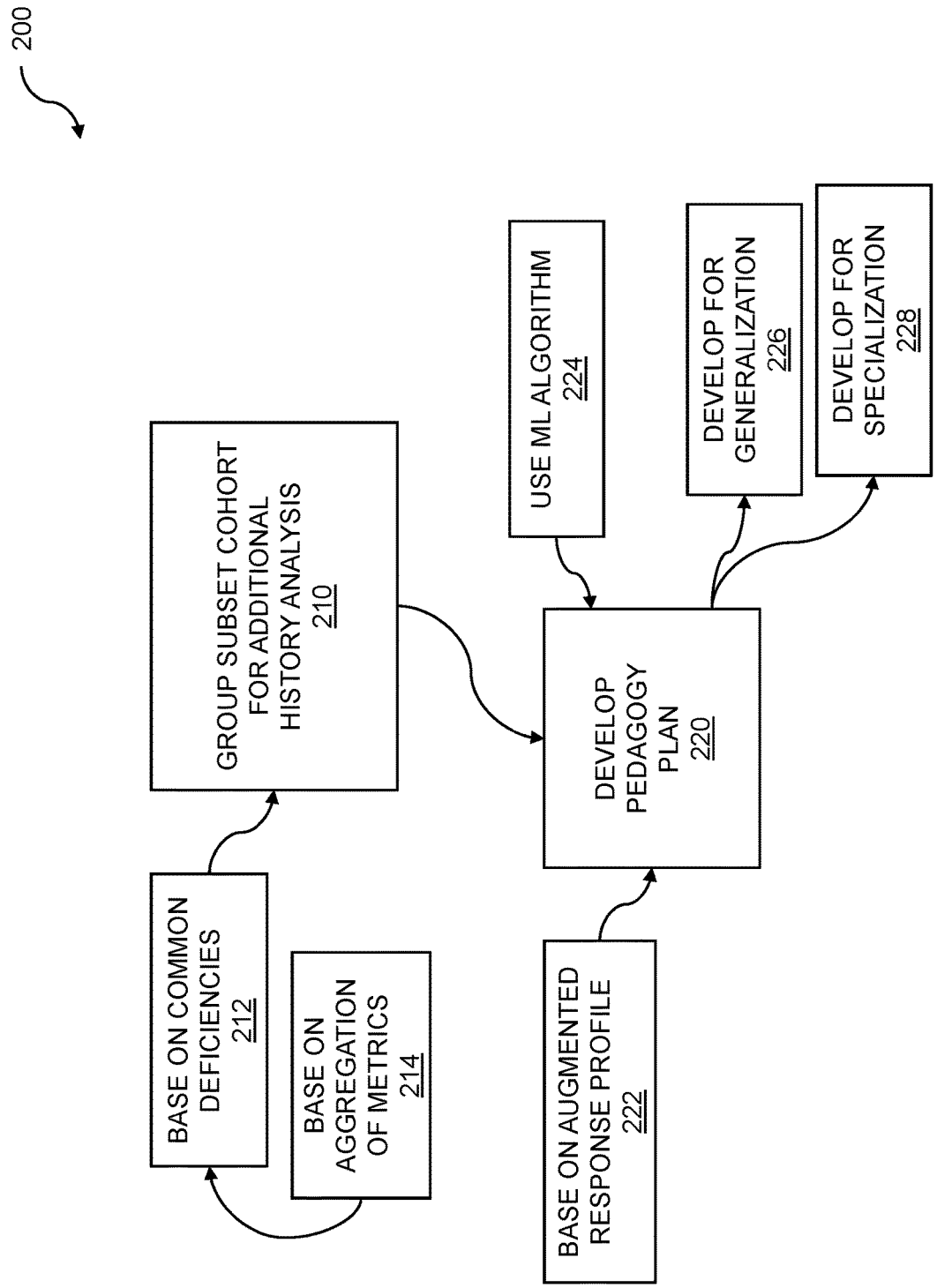
FIG. 2 is a flow diagram for pedagogy plan development.

FIG. 2 is a flow diagram for pedagogy plan development. New cybersecurity threats detected by one or more applications, such as network-connected cybersecurity threat protection applications, are assigned to a cohort of analysts. Individual analysts within the cohort can possess different skill sets, experience levels, certifications, and so on. Ideally, a threat that is detected is assigned to the analyst most capable of managing and countering the threat. However, based on a caseload associated with the analyst, the analyst can be fully occupied prior to receiving a new cybersecurity threat assignment. Further, an analyst can experience difficulty addressing a particular threat due to inexperience, lack of training, and so on. A pedagogy plan can be developed for one or more analysts. The pedagogy plan can be used to improve analyst skillsets, fill in gaps in analyst training, broaden analyst capabilities, enhance analyst career advancement, and the like. Pedagogy plan development improves cybersecurity management and supports cybersecurity operations center load balancing. A cybersecurity security operations center (SOC) caseload history is obtained. A computer platform is used to analyze triage results from the SOC caseload history to produce an analyst threat response profile. The analyst threat response profile is augmented with threat response resolution metrics. Notification of a new cybersecurity threat is received across a cybersecurity network by the SOC. The new cybersecurity threat is assigned to a specific analyst, based on the analyst threat response profile that was augmented.

The flow 200 includes grouping 210 a subset cohort of analysts staffing the SOC for additional caseload history analysis. The subset cohort can include new or inexperienced analysts; analysts who are due for recertification; analysts who experienced particular difficulties addressing a cybersecurity threat, and so on. In the flow 200, the additional caseload history is based on common resolution deficiencies 212. The deficiencies can include overly long cybersecurity threat management times, inabilities to counter or remove the threat, insufficient communication with peers and supervisors, and the like. The deficiencies can include gaps in training, certification, experience, etc. The deficiencies can be identified using a variety of techniques. In the flow 200, the common resolution deficiencies are based on an aggregation 214 of the threat response resolution metrics. Recall that the resolution metrics can include an initial response time, a closure response time, a peer interaction metric, and so on. The aggregation in the metrics can indicate a cohort-wide training gap, consistently slow response times, etc.

The flow 200 further includes developing a pedagogy plan 220 for one or more analysts within a cohort of analysts staffing the SOC. The pedagogy plan can include a "lesson plan" for training the analysts. The pedagogy plan can include coursework, laboratory work, mentoring sessions, internships, and so on. The plan can include remedial analyst training when and if needed by the cohort of analysts. The plan can further include analyst certification training. In the flow 200, the pedagogy plan is developed based on the analyst threat response profile that was augmented 222 with threat response resolution metrics. The pedagogy plan can address cybersecurity threat initial response time, closure response time, peer and supervisor interaction, etc. The pedagogy plan can be developed using a variety of techniques such as advice from experts, use of a proven plan, and the like. Such techniques can be static and may not be adaptable to the needs of individual analysts. In the flow 200, the pedagogy plan is developed using a machine learning (ML) algorithm 224. The machine learning algorithm can be developed by training a network such as a neural network. The training can be based on the application of a training dataset, where the training dataset includes data and expected results from processing the data. The ML algorithm can identify "areas for improvement" associated with one or more analysts. In the flow 200, the pedagogy plan is developed for analyst generalization 226. Analyst generalization can include analyst training for the cohort of analysts for a plurality of cybersecurity threats. In the flow 200, the pedagogy plan is developed for analyst specialization 228. The specialization can include analyst training for mastering management and response to a type of cybersecurity threat.

Various embodiments of the flow 200 can be included in a computer program product embodied in a non-transitory computer readable medium that includes code executable by one or more processors.

Figure 3:
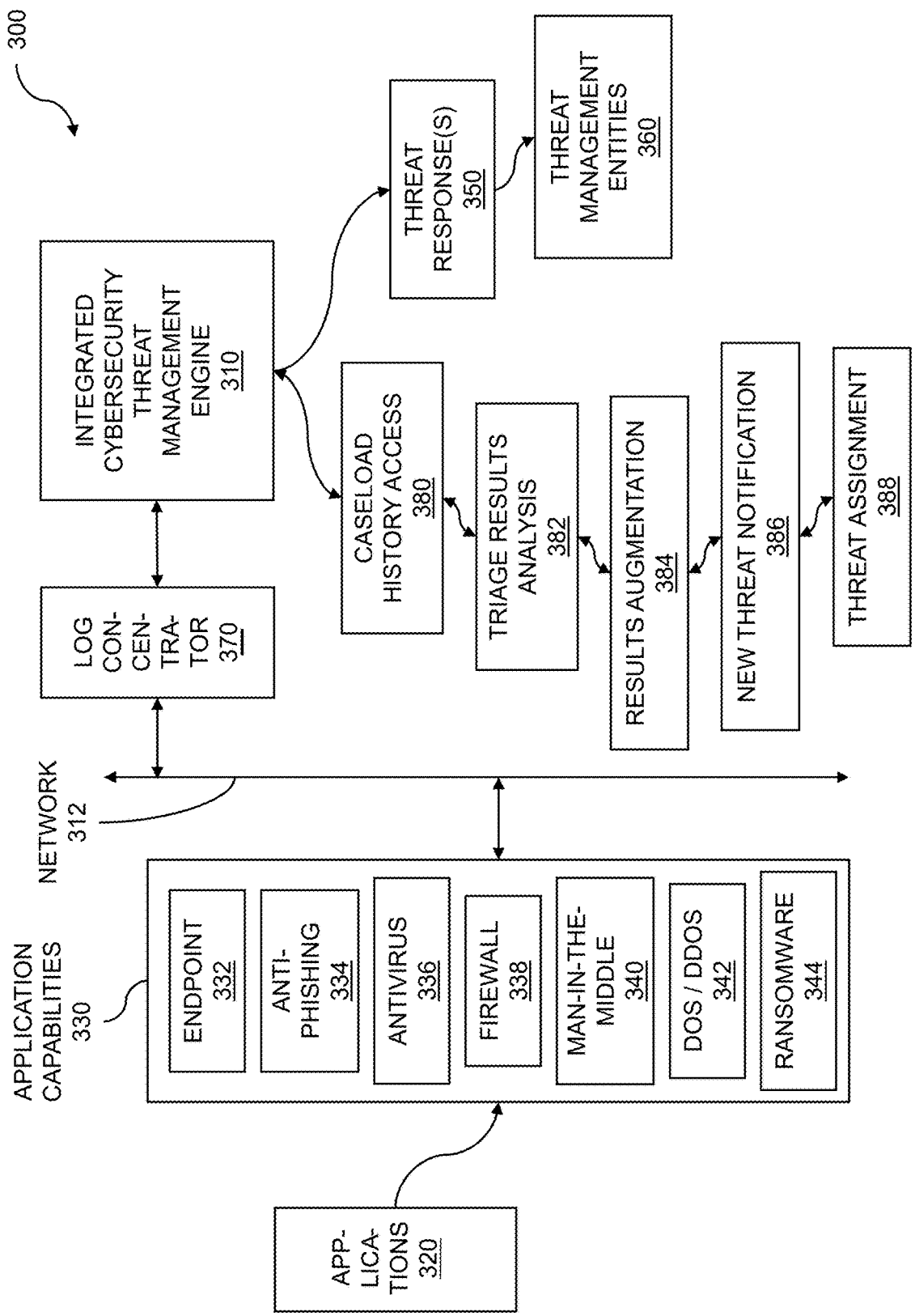
FIG. 3 is a system block diagram for cybersecurity operations center load balancing.

FIG. 3 is a system block diagram for cybersecurity operations center load balancing. Cybersecurity operations center load balancing can be implemented based on workflow management. The cybersecurity operations center workflow can be managed using a supervisory workflow element. The supervisory workflow element enables cybersecurity management. Threat management such as cybersecurity threat management includes detecting new cybersecurity threats and assigning those threats to one or more analysts. An analyst to whom a new cybersecurity threat can be assigned can be selected for the assignment based on an analyst threat response profile. The threat response profile is produced by analyzing triage results from a security operations center caseload history. The profile can include analyst qualifications, certifications, training, experience, success rate, and so on. The profile can be augmented with threat response resolution metrics such as an initial response time, a closure response time, and a peer interaction metric. The selected analyst may not be available to handle the new cybersecurity threat because of a caseload that is already "heavy" or full. In order to make the analyst available to handle the new cybersecurity threat, one or more cases within the analyst's caseload can be reassigned to one or more other analysts, thereby freeing the analyst to handle the new cybersecurity threat. Cybersecurity management is accomplished by cybersecurity operations center load balancing. A cybersecurity security operations center (SOC) caseload history is accessed. A computer platform is used to analyze triage results from the SOC caseload history to produce an analyst threat response profile. The analyst threat response profile is augmented with threat response resolution metrics. Notification of a new cybersecurity threat is received across a cybersecurity network by the SOC. The new cybersecurity threat is assigned to a specific analyst, based on the analyst threat response profile that was augmented.

An example system block diagram for threat management is shown. Threat management, such as cybersecurity threat management, is critical to an organization. The cybersecurity threat management is used to monitor operations such as data operations within the organization. When anomalies or outright threats are detected, threat management applies a variety of techniques to determine the cause of an anomaly, a source of a threat, and responses to the anomalies and threats. The system block diagram 300 can include an integrated cybersecurity threat management engine 310. The management engine can access applications; collect and ingest log files from the applications; sort, integrate, and evaluate threat protection elements; and so on. The engine can include one or more processors, processor cores within integrated circuits or chips, CPUs, GPUs, and so on. The management engine can be coupled to a network 312 such as a computer network. The network can be based on wired and wireless communications techniques.

The system block diagram 300 can include a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, can perform similar or redundant tasks, and the like. The applications within the plurality of cybersecurity threat protection applications can include application capabilities 330. The application capabilities can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities can include anti-phishing 334 techniques. "Phishing" threats can be based on sending fraudulent email messages, where the messages appear to be from a legitimate sender who may be known to the recipient. The messages are used to gather sensitive, identifying information about an individual which is then used to defraud the individual. The application capabilities can include antivirus 336 techniques. Antivirus techniques can be used to detect viruses that can be embedded in data such as images, audio files, and so on. The application capabilities can include firewall 338 techniques. Firewall techniques can be used to block network traffic, applications, etc. that can attempt to penetrate a network and IT infrastructure using one or more network ports and communications protocols. The application capabilities can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities can include denial of service (DOS) and distributed denial of service (DDOS) 342 detection techniques. Denial of service attacks attempt to render a website, computer, processor, and so on unreachable or unusable by overwhelming it with requests. The application capabilities can include ransomware 344 detection techniques. Ransomware attacks encrypt a victim's data. The encrypted data is only decrypted, if at all, after payment of a ransom.

The system block diagram 300 includes one or more threat responses 350. The one or more threat responses are generated by the integrated cybersecurity threat management engine 310. The generated responses can be provided to a cybersecurity threat management entity 360. A cybersecurity threat management entity can include a human-based entity, a machine-based entity, or a combination of human-based and machine-based entities. In embodiments, the cybersecurity threat management entity can be a cybersecurity professional. The cybersecurity professional can be an employee of an organization, a consultant to the organization, and so on. In other embodiments, the cybersecurity threat management entity can be a security orchestration, automation, and response (SOAR) application. The SOAR application can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

The system block diagram 300 includes cybersecurity security operations center (SOC) caseload history access 380. The caseload history is accessed to enable cybersecurity operations center load balancing. The caseload history includes a record of cybersecurity threat notifications received, a cohort of analysts to whom the threat notifications were assigned, threat resolution outcomes, and so on. The SOC caseload history can be created by a security orchestration, automation, and response (SOAR) system. Discussed previously, the SOAR application microservice can handle threat detection, response generation, case tracking, and so on. In embodiments, the synchronization element can implement a multidirectional synchronization server. The system block diagram 300 can include triage results analysis 382. The triage results from the SOC history are analyzed to produce an analyst threat response profile. The threat response profile can include an analyst name, experience level, training level, certifications, expertise, etc.

The system block diagram 300 can include a results augmentation element 384. The augmentation element can augment the analyst threat response profile with threat response resolution metrics. In embodiments, the threat response resolution metrics can include an initial response time, a closure response time, and a peer interaction metric. The threat response resolution metrics can be updated based on provision of additional information, analysis of the additional information, etc. Further embodiments include updating the threat response resolution metrics with a subjective rating. The subjective rating can be supplied from a variety of sources. In embodiments, the subjective rating can be supplied by management, peers, machine learning, and so on.

The system block diagram includes a new threat notification 386. The new threat notification can be received from one or more cybersecurity threat detection applications, systems, and so on. The notification can be received across a cybersecurity network. The cybersecurity threat can be received by the cybersecurity security operations center. The system block diagram includes a threat assignment element 388. The threat assignment element assigns the new cybersecurity threat to a specific analyst, based on the analyst threat response profile that was augmented. Other parameters, factors, and so can be used for the assignment of the cybersecurity threat. In embodiments, the assigning can be further based on a weighting of threat severity, threat complexity, and analyst availability. Ideally, a new cybersecurity threat would be assigned to the analyst who is best qualified to address the threat. However, the analyst may not be available at a certain time because the analyst has already been assigned a full caseload. Further embodiments can include reassigning an existing SOC caseload to increase availability of the specific analyst. The reassigning can be based on re-triaging an existing SOC caseload to determine an analyst's qualification to address the threat, availability, etc.

Figure 4:
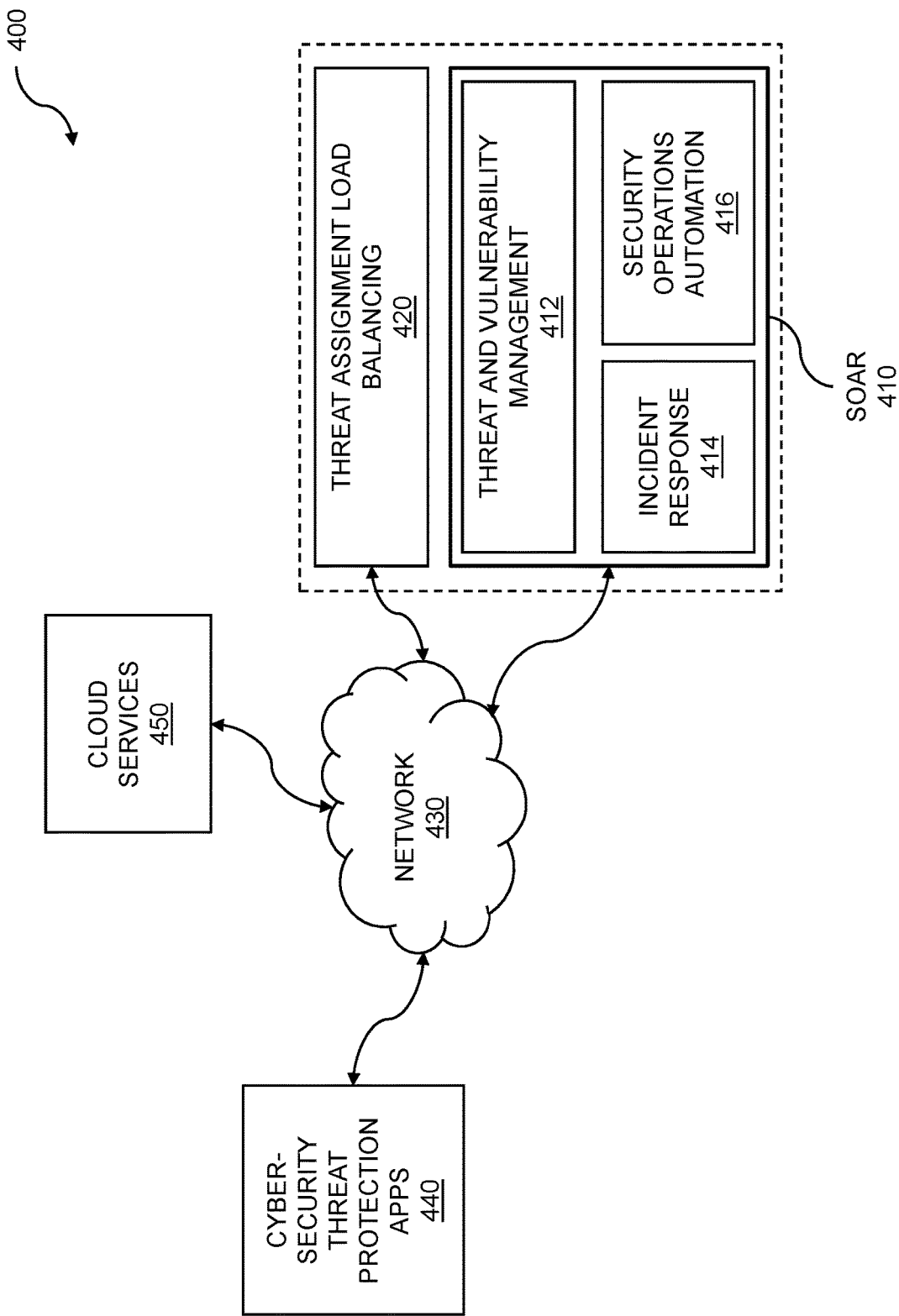
FIG. 4 illustrates a cloud-connected security orchestration, automation, and response (SOAR) system.

FIG. 4 illustrates a cloud-connected security orchestration, automation, and response (SOAR) system. Discussed above and throughout, cybersecurity threats arise as often as every few seconds. These threats target individual users, businesses, universities, hospitals, government agencies, and so on. The cybersecurity threats constitute extreme menaces, and indeed existential crises, to the enterprises. Cybersecurity threat management includes identifying that a threat is underway, what IT infrastructure and data are under attack, the type of threat, etc. The cybersecurity threat management ideally then proceeds to block or remove the threat, isolate affected infrastructure, perform eradication or remediation, and the like. Cybersecurity management is enabled by cybersecurity operations center load balancing. A cybersecurity security operations center (SOC) caseload history is obtained. A computer platform is used to analyze results from the SOC caseload history to produce an analyst threat response profile. The analyst threat response profile is augmented with threat response resolution metrics. Notification of a new cybersecurity threat is received across a cybersecurity network by the SOC. The new cybersecurity threat is assigned to a specific analyst, based on the analyst threat response profile that was augmented.

A cloud-connected security orchestration, automation, and response (SOAR) system is illustrated 400. The SOAR can comprise a cybersecurity component such as 410, where the SOAR can be based on one or more cybersecurity threat protection applications, tools, techniques, and so on. The SOAR can enable data collection from a wide range of data sources such as threat data sources. The threat data sources can include data uploaded by cybersecurity experts, data produced by cybersecurity threat protection applications, and so on. The SOAR can be used to manage threat protection processes, anti-threat technologies, and human expertise. The SOAR can centralize management of IT assets such as networks, processors, data storage elements, etc. The SOAR can provide threat alerts and can also provide contexts for the alerts. The SOAR can further automate responses to threats, adapt the responses using machine learning, and so on.

The SOAR 410 can include one or more components associated with cybersecurity threat management. The SOAR can include a threat and vulnerability management component 412. The threat and vulnerability management component can configure and control IT infrastructure elements such as routers, switches, processors, storage area networks (SANs), and so on. The SOAR can include an incident response component 414. The incident response component can provide alerts, can trigger one or more actionable responses, and the like. In embodiments, the actionable response can enable scalability of a connected SOAR system. The SOAR can be scaled up to address a large number of threats, to reduce threat response time, etc. In embodiments, the actionable response can include a recommendation for a cybersecurity professional. The recommendation can include a recommendation for threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The SOAR can include security operations automation 416. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. The SOAR can be associated with a threat assignment load balancing element 420. The threat assignment load balancing element can balance the assignment of cybersecurity threats to a cohort of analysts. The load balancing element attempts to assign a new cybersecurity threat to a specific analyst. The specific analyst is selected based on a threat response profile, where the threat response profile can include an experience level, certifications, success rate, and so on. The threat response profile can be augmented with threat response resolution metrics such as initial response time, a closure response time, and a peer interaction metric. However, the assignment of the new cybersecurity threat to the analyst can be stymied by a full or heavy caseload already assigned to the analyst. In order to make the analyst available to handle the new cybersecurity threat, one or more of the cases within the caseload associated with the analyst can be reassigned to other analysts, thereby freeing the analyst to handle the new cybersecurity threat.

The supervisory workflow element can provide access to a threat protection workflow, can process notifications received from one or more cybersecurity threat protection applications, can detect actions within a workflow such as an irreversible action, and so on. In embodiments, the supervisory workflow element can be structured to perform a test on a cybersecurity threat protection application notification. The test can be used to verify a cause for the notification, to compare the notification with one or more other notifications from the same threat protection application or from other threat protection applications, etc. In embodiments, the test can include an if/then analysis, a table lookup analysis, an if/then/else analysis, or a machine learning algorithm-based analysis. In a usage example, two antivirus applications can be synchronized. One antivirus application can provide an alert for a detected cybersecurity threat while the second application can provide no indication of a threat. Because of differing detection results, the applications can be analyzed for proper operation, checked for malware, and so on. The supervisory workflow element can perform these checks and any required remediations without burdening the SOAR.

The SOAR can use a network 430 to access a plurality of cybersecurity threat protection applications 440. The network can include a wired network, a wireless network, a hybrid wireless/wireless network, and so on. The network can be based on wired networking standards such as Ethernet™ (IEEE 802.3), wireless networking standards such as Wi-Fi™ (IEEE 802.11), and so on. The cybersecurity threat protection applications can provide capabilities such as endpoint protection, anti-phishing, antivirus, firewalls, and so on. The cybersecurity threat protection applications can further detect and protect against man-in-the middle ruses, denial of service (DOS) and distributed denial of service (DDOS) attacks, ransomware, and the like. In embodiments, the background synchronization service can communicate to the plurality of network-connected cybersecurity threat protection applications using cloud services 450. The cloud services can provide access and can provide IT services such as software as a service (SaaS), platform as a service (PaaS), infrastructure as a service (IaaS), and so on.

Figure 5A:
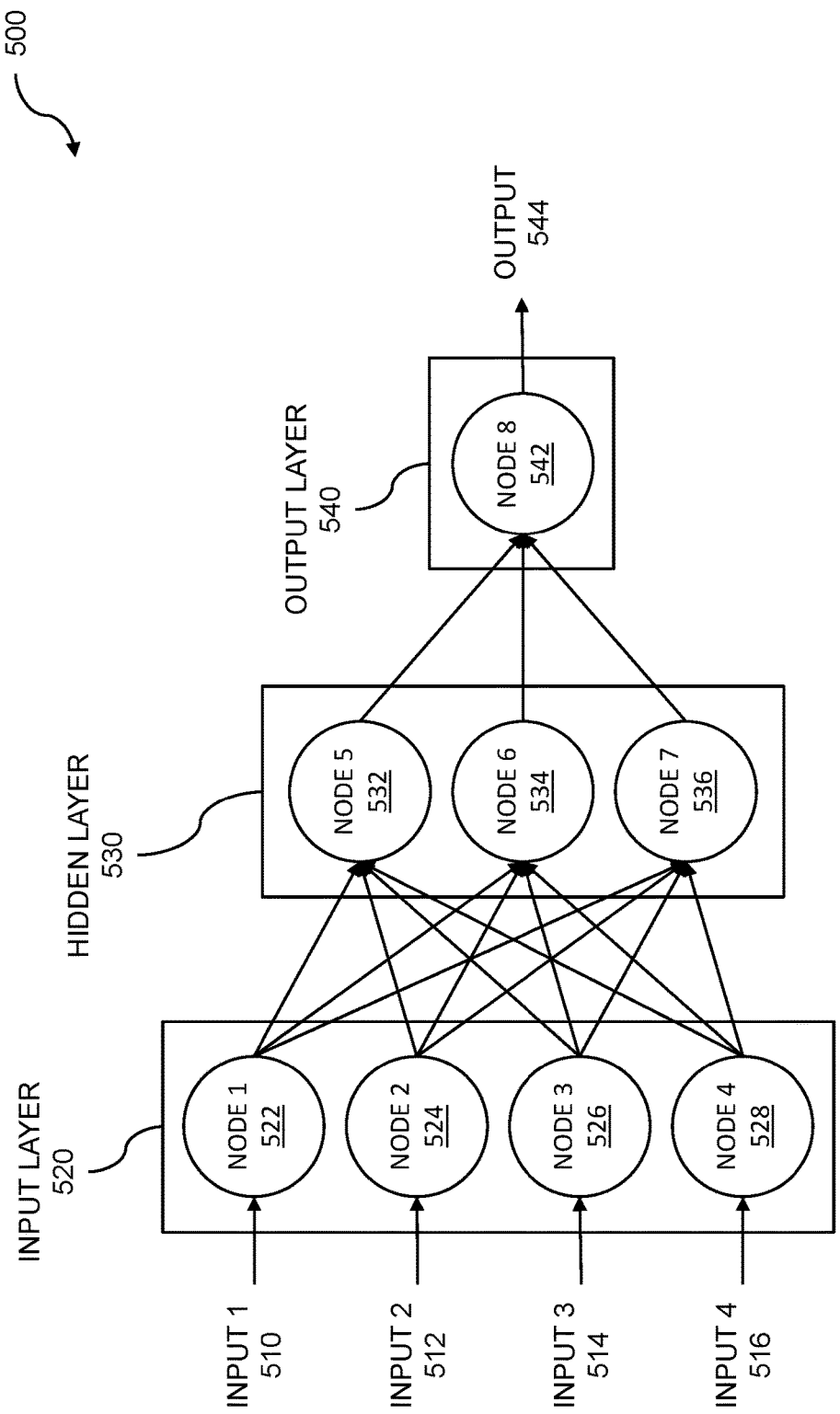
FIG. 5A shows an example neural network for machine learning.

FIG. 5A shows an example neural network for machine learning. The neural network for machine learning can be based on a variety of neural network types such as a convolutional neural network (CNN), a deep neural network (DNN), a recurrent neural network (RNN), and so on. The neural network for machine learning comprises a plurality of layers, where the layers can include one or more of an input layer, an output layer, a convolutional layer, a bottleneck layer, an activation layer, and so on. The bottleneck layer, if present within the neural network, can be used for neural network training. The trained neural network can be applied to cybersecurity operations tasks such as cybersecurity operations center load balancing. A neural network for machine learning can apply classifiers. The classifiers can be learned by analyzing one or more security operations center caseload histories. A cybersecurity security operations center (SOC) caseload history is accessed. A computer platform is used to analyze triage results from the SOC caseload history to produce an analyst threat response profile. The analyst threat response profile is augmented with threat response resolution metrics. Notification of a new cybersecurity threat is received across a cybersecurity network by the SOC. The new cybersecurity threat is assigned to a specific analyst, based on the analyst threat response profile that was augmented.

The example 500 shows a neural network for machine learning. The neural network includes one or more layers such as input layers, hidden layers, and output layers. Layers, such as convolutional layers, activation layers, bottleneck layers, etc., that perform operations associated with applications such as machine learning can also be included within the example neural network. Data can be provided to the neural network though inputs such as input 1 510, input 2 512, input 3 514, and input 4 516. While four inputs are shown, other numbers of inputs can also be applied to the neural network. The data can include training data, production data, etc. The data is provided to an input layer 520 of the neural network. The input layer comprises one or more nodes such as node 1 522, node 2 524, node 3 526, and node 4 528. While four nodes are shown within the input layer, other numbers of nodes can be included. One or more weights (explained below) can also be provided to each node within the input layer. The outputs of the nodes associated with the input layer can be coupled to inputs of nodes associated with a hidden layer such as hidden layer 530. The hidden layer can comprise one or more nodes such as node 5 532, node 6 534, and node 7 536. While three nodes are shown, other numbers of nodes can be included in the hidden layer. In the example neural network, each output of the nodes associated with the input layer is coupled to each input of the nodes associated with the hidden layer. The coupling of each node output to each node input accomplishes a fully connected (FC) layer within the neural network.

The example neural network can include one or more hidden layers. The hidden layers can include substantially similar or substantially dissimilar numbers of nodes. The hidden layers can be fully connected layers as just described, convolutional layers where a subset of outputs is connected to a subset of inputs, bottleneck layers, activation layers, etc. The example neural network includes an output layer 540. The output layer can include one or more nodes such as node 8 542. While one node is shown within the output layer, the output layer can include more than one node. The output layer produces an output 544. The output can include a value, a probability, and so on.

Figure 5B:
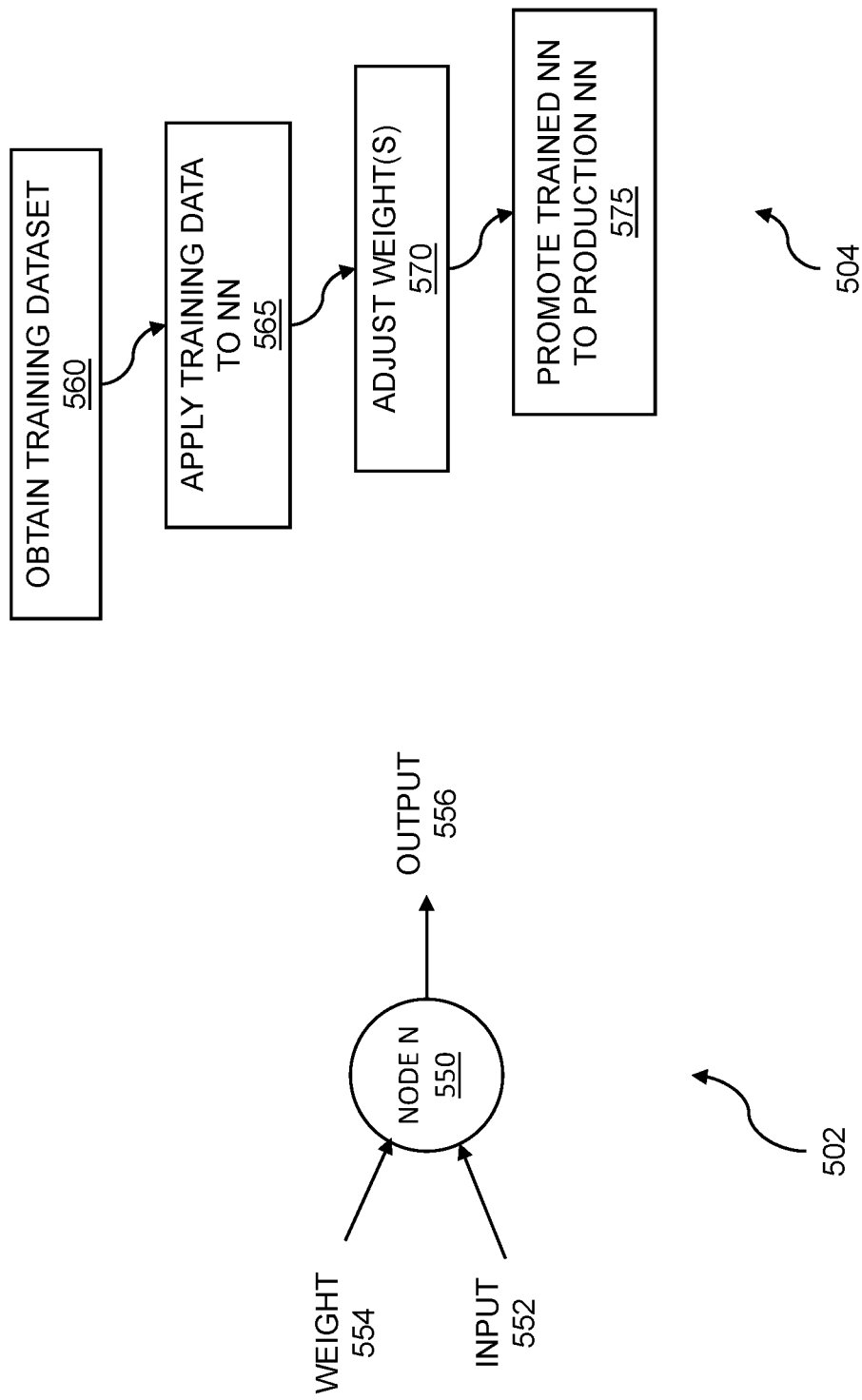
FIG. 5B illustrates training a neural network for machine learning.

FIG. 5B illustrates training a neural network for machine learning. Discussed previously, a neural network comprises layers of nodes or neurons such as artificial neuron 502. The artificial neuron can process input data to produce output data. An example node 550 is shown. A neuron can be coupled to one or more signals or inputs such as input 552 and one or more weights such as weight 554. The node multiplies each input by its corresponding weight and maintains a running sum of the resulting products. The output of the node, such as output 556, can be calculated by applying a function such as a transfer function to the sum of products of the inputs and weights. The transfer function can include various types of functions such as a unit step or threshold function, a sigmoid, a Gaussian function, a piece-wise linear function, and so on.

Each neuron within a neural network can be trained. The training can be based on using a dataset that includes known data. The training can be further based on comparing results of data processing by the neural network with expected results associated with the known data. The expected results include results of neural network processing of the dataset of known data. One or more weights associated with each node are adjusted until the neural network can form an inference that produces the expected result. In a usage example, a dataset of images of dogs or cats can be used to train a neural network to identify dogs or cats within images not included in the training data set. A flow for neural network training is shown. The neural network training can include training a neural network for machine learning applications. The flow 504 includes obtaining 560 a training dataset. The training dataset can include cybersecurity operations center caseload histories, resolutions to cybersecurity threats, and so on. The training dataset can include threat response resolution metrics. The training dataset can further include one or more objective ratings, where the objective ratings can be used to update the threat response resolution metrics. Further, a subjective rating can be supplied by management, peers, machine learning, etc.

The flow 504 includes applying 565 the training data to a neural network. The training data is provided to the inputs of the neural network and the neural network proceeds to process the test data. The flow 504 includes adjusting one or more weights 570 associated with the nodes of the neural network. The adjusting the weights can enable enhanced convergence by the neural network to an expected result. The enhanced convergence can reduce neural network processing time, improve inference accuracy, etc. The adjusting the weights can include an iterative process. The adjusting weights associated with the nodes within the neural network can become more accurate as further training data is provided. The flow 504 includes promoting the trained neural network 575 to a production neural network. The production neural network can be used to process data such as a SOC caseload history. The production neural network can continue to adapt or learn based on processing further data. The learning can include further adjustment to one or more weights associated with nodes within the neural network. In embodiments, the accessing, the analyzing, the augmenting, the receiving, and the assigning, all of which are discussed previously, can be converted to machine learning training data. The machine learning training data that was converted can be used to further train or adjust the machine learning neural network.

Figure 6:
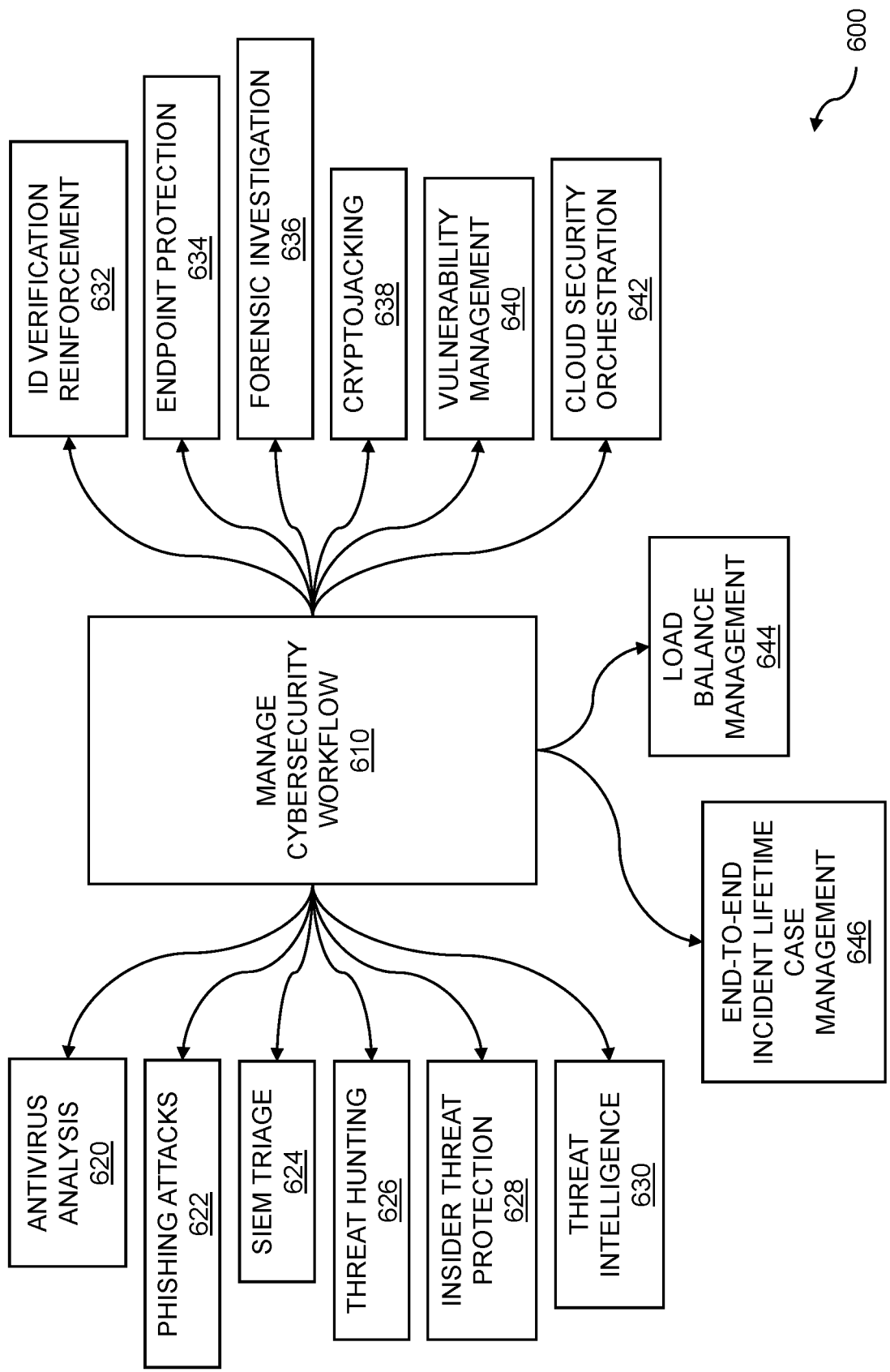
FIG. 6 is a flow diagram for cybersecurity workflow management.

FIG. 6 is a flow diagram for cybersecurity workflow management. Information technology (IT) infrastructure comprises computing devices, storage devices, networks, perhaps personal devices, and so on. Whether these IT elements are operated by an individual for personal use or by an organization in support of operations, all of the IT elements are targets of malicious attacks from outside an organization. Worse yet, some of the attacks can even originate from within an organization. Cybersecurity management is based on cybersecurity operations center load balancing. The load balancing can include assigning and reassigning analyst caseloads. A cybersecurity security operations center (SOC) caseload history is accessed. A computer platform is used to analyze triage results from the SOC caseload history to produce an analyst threat response profile. The analyst threat response profile is augmented with threat response resolution metrics. Notification of a new cybersecurity threat is received across a cybersecurity network by the SOC. The new cybersecurity threat is assigned to a specific analyst, based on the analyst threat response profile that was augmented.

The diagram 600 includes cybersecurity management 610. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The diagram 600 includes antivirus analysis 620. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The diagram 600 can include analysis of phishing attacks 622. Phishing is a form of attack that attempts to fraudulently obtain personal, sensitive, or private data and information. The data or information that is sought by a phishing attack can include personal information such as name, address, date of birth, telephone number, email address, and so on.

The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The diagram 600 includes security information and event management (STEM) triage 624. SIEM, which combines the management of security information and security events, can provide analysis of security alerts, alarms, warnings, etc. in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The diagram 600 includes threat hunting 626. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The diagram 600 includes insider threat protection 628. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The diagram 600 includes threat intelligence 630. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The diagram 600 includes identity verification reinforcement 632. Identity verification can include techniques to verify that a person who has access to computing systems, data systems, networks, and so on, that are associated with an enterprise is in fact a real person. Identity verification can be based on physical documents such as government issued identification documents. The diagram 600 can include endpoint protection 634. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device, including personal electronic devices, must meet certain standards prior to connection to the enterprise network. The standards can include approved devices, operating systems, applications, antivirus applications, virtual private network apps, etc.

The diagram 600 includes forensic investigation 636. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The diagram 600 includes the detection of cryptojacking 638. Cryptojacking can include hijacking of computers, servers, personal electronic devices, and so on for the purposes of mining cryptocurrency. The diagram 600 includes vulnerability management 640. Vulnerability management seeks to reduce risks to computing systems, data systems, networks, and so on by identifying, evaluating, correcting, and communicating vulnerabilities associated with the computing systems and the applications that are executed on the computing systems. The diagram 600 includes cloud security orchestration 642. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement.

The diagram 600 includes load balance management 644. The load balance management can balance and adjust assignment of cybersecurity threats to one or more analysts. The load balance management attempts to assign a cybersecurity threat to a specific analyst who is best suited to handling and addressing the cybersecurity threat. If the caseload associated with the analyst is "heavy" or "full", then one or more cases assigned to that analyst can be reassigned to one or more other analysts. In embodiments, the reassigning can include a re-triage of an existing SOC caseload. The re-triage results can be used to reassign one or more analysts determined to be capable of handling the cybersecurity threat. The diagram 600 includes end-to-end incident lifetime case management 646. An incident can include a virus outbreak, a distributed denial of service (DDOS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident.

Figure 7:
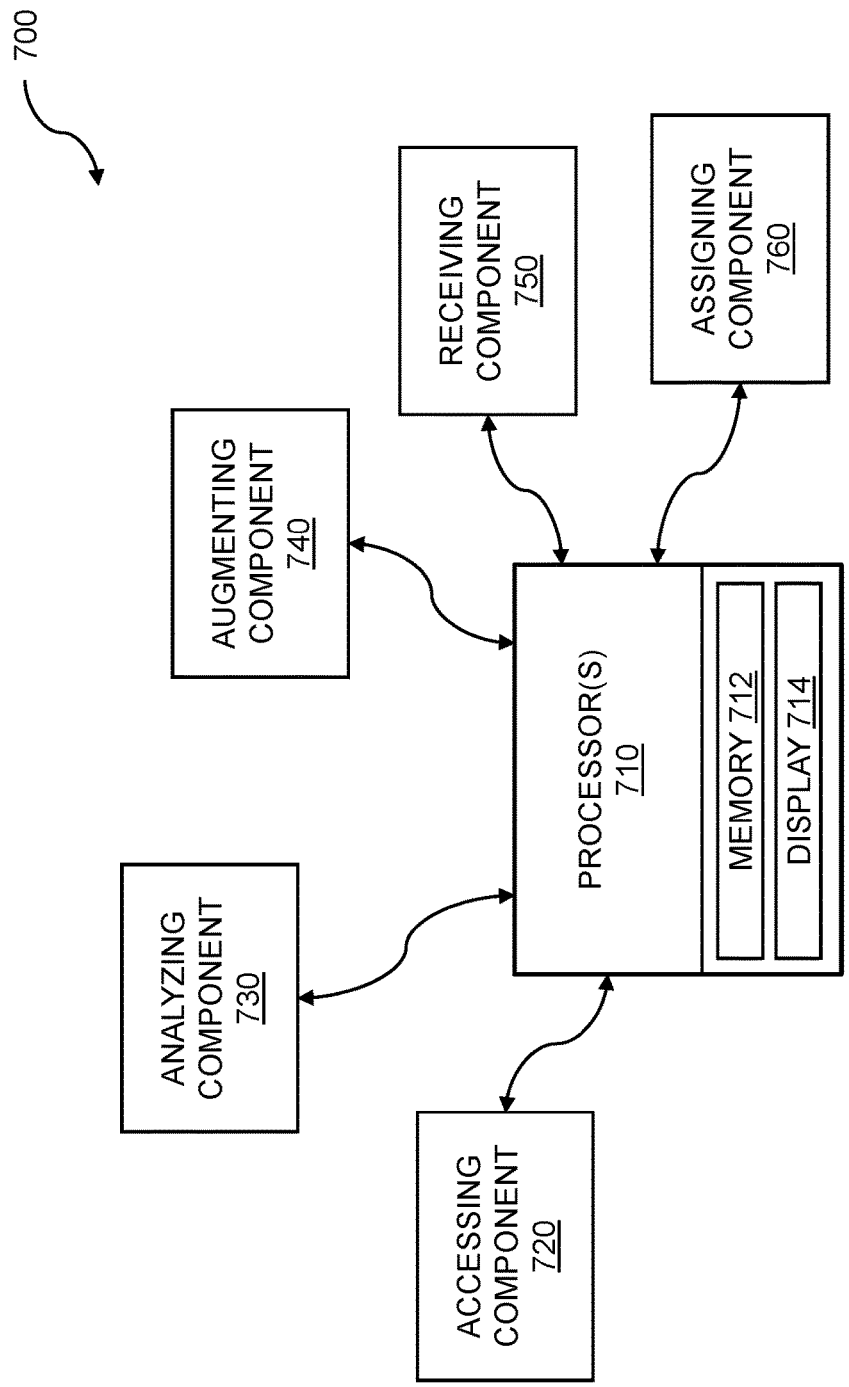
FIG. 7 is a system diagram for cybersecurity operations center load balancing.

FIG. 7 is a system diagram for cybersecurity operations center load balancing. Organizations such as businesses, hospitals, government agencies, schools, and others take great pains to secure their computing operations and infrastructure against cybersecurity threats. The detection of and response to all cybersecurity threats are mission critical to each of these organizations, irrespective of their size. The organizations perform data operations including manipulations, storage, security, transfers, and so on. The computing infrastructure used to perform the computational operations includes servers, desktop computers, laptop computers, handheld electronic devices, etc. Some cybersecurity threats are designed to exploit hardware and software vulnerabilities, while other cybersecurity threats are based on social engineering techniques. These latter techniques include honeytraps, clickbait, phishing attacks, ransomware, distributed denial of service (DDoS) attacks, third-party software hacks, targeting cloud computing and storage vulnerabilities, and the like.

Cybersecurity management is based on cybersecurity operations center load balancing. A cybersecurity security operations center (SOC) caseload history is accessed. The SOC caseload history includes a record of threats detected, techniques used to address the threats, and so on. A computer platform is used to analyze triage results from the SOC caseload history to produce an analyst threat response profile. The analysis response profile includes caseloads of an individual analyst, techniques used by the analyst to address the threat, analyst success rate, and the like. The analyst threat response profile is augmented with threat response resolution metrics. The threat response resolution metrics include an initial response time, a closure response time, and a peer interaction metric. Notification of a new cybersecurity threat is received across a cybersecurity network by the SOC. The cybersecurity threat can include a previously experienced attack, a new attack, a combination of attacks, etc. The new cybersecurity threat is assigned to a specific analyst, based on the analyst threat response profile that was augmented. If the caseload associated with the specific analyst is already full, previously assigned cybersecurity threats can be reassigned to other analysts. The reassigning includes a re-triage of existing SOC caseload.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more cybersecurity applications, log files, information associated with one or more data networks, a cybersecurity operations center caseload history, a supervisory workflow, data associated with a status, one or more actionable responses, and the like. Information associated with cybersecurity management can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can include an accessing component 720. The accessing component 720 can access a cybersecurity security operations center (SOC) caseload history. The caseload history can include a log of detected cybersecurity threats, a list of analysts engaged to address the threats, engagement outcomes, and so on. Access to the SOC caseload history can be enabled through a graphical user interface (GUI). The GUI can provide a graphical view of a caseload history, such as displaying types of cybersecurity threats, frequencies of threat detections, threat response outcomes, time to address the threats, and the like. The SOC caseload history can include notifications from a plurality of network-connected cybersecurity threat protection applications. The applications can include applications for threat detection, assessment, and response management; web security; antivirus; dark web monitoring; security ("white hat") testing; and other cybersecurity threat protection application capabilities. In embodiments, the cybersecurity threat protection application capabilities can include endpoint protection, anti-phishing protection, antivirus protection, firewall protection, man-in-the-middle protection, denial of service protection, distributed denial of service protection, and ransomware protection. The plurality of cybersecurity threat protection applications can include at least two different data management schemas. A data management schema can include an organization or collection of management techniques associated with data. The management techniques can include data storage, access control to data (e.g., access control list or ACL, role-based access), and so on.

The system 700 can include an analyzing component 730. The analyzing component 730 can analyze, on a computer platform, triage results from the SOC caseload history to produce an analyst threat response profile. The computer platform can include a desktop computer, a laptop computer, a server, a blade server, a remote server, a cloud server, and so on. The analyzing can include analyzing patterns of behavior within a cohort of cybersecurity analysts. The patterns of behavior can include an amount of time to close a cybersecurity threat case, a time to respond to the threat, an amount of chatter among analysts within a cybersecurity threat incident, and so on. In embodiments, the triage results include an analysis of threat severity and threat complexity. The threat severity can be based on a qualitative assignment such as low, medium, or high; a numerical value or percentage; and so on. The threat severity can be based on exceeding a tolerance threshold. In embodiments, the triage results are matched with analyst availability. The analysis can examine whether an analyst was appropriately assigned triage results, was best suited to handling the triage results, etc. The analyst threat response profile can include a number of cybersecurity threat cases handled, types of threats handled, and so on. The threat response profile can further include training received, certifications earned, and the like. Further embodiments include updating the threat response resolution metrics with a subjective rating. The subjective rating can be provided or supplied from a variety of sources, where the sources can include management, peers, and machine learning.

The system 700 can include an augmenting component 740. The augmenting component 740 can augment the analyst threat response profile with threat response resolution metrics. The threat response resolution metrics can be used to gauge or measure analyst performance with respect to threat resolution. In embodiments, the threat response resolution metrics can include an initial response time, a closure response time, and a peer interaction metric. The threat response metrics can be used to identify analyst strengths and weaknesses. The metrics can be associated with more than one analyst, based on the SOC case history. In embodiments, a subset cohort of analysts staffing the SOC can be grouped for additional caseload history analysis. The cohort may have experienced difficulties with a type of cybersecurity threat, the volume of cybersecurity threats, and so on. In embodiments, the additional caseload history can be based on common resolution deficiencies.

The system 700 can include a receiving component 750. The receiving component 750 can receive, across a cybersecurity network, notification of a new cybersecurity threat by the SOC. The receiving notifications can include receiving status reports and updates from at least one of the plurality of cybersecurity threat protection applications. Notification from a cybersecurity threat protection application can include an indication of normal operation or other status of one or more processors, networks, and other information technology (IT) infrastructure. The received notifications can include an abnormal status such as high-volume incoming status data. The status data from the one or more cybersecurity threat protection applications can include an indication of a potential, detected, or ongoing cybersecurity event or situation. In embodiments, the irreversible action can include a destructive response. The destructive response can be initiated by an unauthorized actor such as a hacker. In embodiments, the destructive response can include killing a process, deleting an account, shutting down a computer, wiping a computer, or shutting down a router. The destructive response can include a hostile action such as unauthorized encryption of data.

The notification can include data associated with an alert, a warning, etc. The notification data can include device-related information. The device-related information can include a type of device such as a handheld device, a portable device, a personal device, a device provided by an organization, etc. The notification data can include an event name, an application name, an event count, a category such as a low-level category, a source IP address and port, a destination IP address and port, a username, a magnitude, etc. The notification data can include threat protection elements. The threat protection elements can include non-cybersecurity, network-related elements. These elements can provide additional information that can help pinpoint a source of a cybersecurity threat, a threat target, a priority level, etc. The non-cybersecurity, network-related elements can include information technology (IT) tool output, network configuration data, cybersecurity threat protection application metadata, network-related metadata, network client physical location data, network client internet protocol (IP) identification data, and user-entered data. The notification data can further include information about the user of a device, a data service, and so on. The user information can include identifying information associated with the user; a user's role, status, and rank within an organization; user privileges such as access and security privileges; user location; and the like.

The system 700 can include an assigning component 760. The assigning component 760 can assign the new cybersecurity threat to a specific analyst, based on the analyst threat response profile that was augmented. The analyst to whom the cybersecurity threat is assigned can include an analyst determined or identified to be the best suited to addressing the new cybersecurity threat. The assignment can be based on analyst experience, training, certifications, and so on. Other factors and parameters can be used for the assigning. In embodiments, the assigning can further be based on a weighting of threat severity, threat complexity, and analyst availability. Since caseloads may not be evenly distributed to the analysts, one or more analysts can have heavy caseloads while other analysts can have light caseloads. If the analyst best suited to addressing a cybersecurity threat has a heavy caseload, one or more of the cybersecurity threat cases can be reassigned, thus enabling the analyst to be available to handle the new cybersecurity threat. Further embodiments can include reassigning an existing SOC caseload to increase availability of the specific analyst. The reassigning can be based on identifying analysts with comparable, similar, or equivalent experience, training, etc. In embodiments, the reassigning can include a re-triage of existing SOC caseload.

In embodiments, the accessing, the analyzing, the augmenting, the receiving, and the assigning are converted to machine learning training data. The machine learning training data can be provided to a network. The network can be trained to identify successes, deficiencies, and other parameters within the SOC case history. Further embodiments include training a neural network using the machine learning training data. Once trained, the neural network can be used to examine cybersecurity operations center history, performance, etc. Further embodiments include executing the receiving and the assigning on the neural network that was trained. The neural network can analyze large SOC caseload history datasets far faster than could a human expert. The neural network can be used to identify threat response successes, deficiencies, and so on. Further embodiments include developing a pedagogy plan for one or more analysts, within a cohort of analysts staffing the SOC, based on the analyst threat response profile that was augmented. The pedagogy plan can include training, certification, analysis, and so on. In embodiments, the pedagogy plan can be developed using a machine learning algorithm. The machine learning algorithm can identify cybersecurity threat response trends within the caseload history. In embodiments, the pedagogy plan can be developed for analyst generalization. The analyst generalization can include cross training, generalized threat response techniques, etc. In other embodiments, the pedagogy plan can be developed for analyst specialization. In both the cases of analyst generalization and analyst specialization, the pedagogy can be used to enhance analyst career development and advancement.

Disclosed embodiments include a computer program product embodied in a non-transitory computer readable medium for cybersecurity management, the computer program product comprising code which causes one or more processors to perform operations of: accessing a cybersecurity security operations center (SOC) caseload history; analyzing, on a computer platform, triage results from the SOC caseload history to produce an analyst threat response profile; augmenting the analyst threat response profile with threat response resolution metrics; receiving, across a cybersecurity network, notification of a new cybersecurity threat by the SOC; and assigning the new cybersecurity threat to a specific analyst, based on the analyst threat response profile that was augmented. Disclosed embodiments further include a computer system for cybersecurity comprising: a memory which stores instructions; one or more processors coupled to the memory wherein the one or more processors, when executing the instructions which are stored, are configured to: access a cybersecurity security operations center (SOC) caseload history; analyze, on a computer platform, triage results from the SOC caseload history to produce an analyst threat response profile; augment the analyst threat response profile with threat response resolution metrics; receive, across a cybersecurity network, notification of a new cybersecurity threat by the SOC; and assign the new cybersecurity threat to a specific analyst, based on the analyst threat response profile that was augmented.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity threat response and management comprising:
   accessing a cybersecurity security operations center (SOC) caseload history;
   generating an analyst threat response profile based on processing the SOC caseload history by a neural network, wherein the neural network is trained to triage results from the SOC caseload history to generate the analyst threat response profile, wherein the neural network comprises:
   a plurality of neurons organized in a plurality of layers and that are coupled to one or more signals and one or more weights, wherein each neuron of the plurality of neurons is trained based on the SOC caseload history, previous cybersecurity threats, and responses to the previous cybersecurity threats;
   augmenting the analyst threat response profile with threat response resolution metrics to generate an augmented threat response profile, wherein the response resolution metrics compromise an analyst closure response time;
   detecting, in a cybersecurity network, a new cybersecurity threat;
   automatically counteracting the new cybersecurity threat based on blocking an intrusion into the cybersecurity network;
   identifying a specific analyst based on providing data about the new cybersecurity threat, the automatic counteracting, and the augmented analyst threat response profile as input to the neural network;

assigning the new cybersecurity threat to the identified specific analyst for cybersecurity response triage and incident lifetime management; and continuously adapting the neural network by adjusting the one or more weights of the plurality of neurons based on data associated with subsequent cybersecurity threats and corresponding computer-automated counteracting measures.

2. The method of claim 1 wherein the threat response resolution metrics include an initial response time and a peer interaction metric.

3. The method of claim 2 further comprising updating the threat response resolution metrics with a subjective rating.

4. The method of claim 3 wherein the subjective rating is supplied by management, by peers, or by machine learning.

5. The method of claim 1 wherein the assigning is further based on a weighting of threat severity, threat complexity, and analyst availability.

6. The method of claim 5 further comprising reassigning an existing SOC caseload to increase availability of the specific analyst.

7. The method of claim 6 wherein the reassigning includes a re-triage of existing SOC caseload.

8. The method of claim 1 wherein the triage results include an analysis of threat severity and threat complexity.

9. The method of claim 8 wherein the triage results are matched with analyst availability.

10. The method of claim 1 wherein a subset cohort of analysts staffing the SOC is grouped for additional caseload history analysis.

11. The method of claim 10 wherein the additional caseload history is based on common resolution deficiencies.

12. The method of claim 11 wherein the common resolution deficiencies are based on an aggregation of the threat response resolution metrics.

13. The method of claim 1 further comprising developing, based on applying the neural network, a pedagogy plan for one or more analysts, within a cohort of analysts staffing the SOC, further based on the analyst threat response profile that was augmented.

14. The method of claim 13 wherein the pedagogy plan is developed using a machine learning algorithm.

15. The method of claim 13 wherein the pedagogy plan is developed for analyst generalization or analyst specialization.

16. The method of claim 1 wherein the accessing, the generating, the augmenting, the detecting, the automatically counteracting, the identifying, and the assigning are converted to machine learning training data for continuously adapting the neural network.

17. The method of claim 16 further comprising executing the detecting, the automatically counteracting, and the assigning with the neural network that was continuously adapted.

18. A computer program product embodied in a non-transitory computer readable medium for cybersecurity threat response and management, the computer program product comprising code which causes one or more processors to perform operations of:

accessing a cybersecurity security operations center (SOC) caseload history;

generating an analyst threat response profile based on processing the SOC caseload history by a neural network, wherein the neural network is trained to triage results from the SOC caseload history to generate the analyst threat response profile, wherein the neural network comprises:

a plurality of neurons organized in a plurality of layers and that are coupled to one or more signals and one or more weights, wherein each neuron of the plurality of neurons is trained based on the SOC caseload history, previous cybersecurity threats, and responses to the previous cybersecurity threats;

augmenting the analyst threat response profile with threat response resolution metrics to generate an augmented threat response profile, wherein the response resolution metrics compromise an analyst closure response time;

detecting, in a cybersecurity network, a new cybersecurity threat;

automatically counteracting the new cybersecurity threat based on blocking an intrusion into the cybersecurity network;

identifying a specific analyst based on providing data about the new cybersecurity threat, the automatic counteracting, and the augmented analyst threat response profile as input to the neural network;

assigning the new cybersecurity threat to the identified specific analyst for cybersecurity response triage and incident lifetime management; and continuously adapting the neural network by adjusting the one or more weights of the plurality of neurons based on data associated with subsequent cybersecurity threats and corresponding computer-automated counteracting measures.

19. A computer system for cybersecurity threat response and management comprising:

a memory which stores instructions;

one or more processors coupled to the memory, wherein the one or more processors, when executing the instructions which are stored, are configured to:

access a cybersecurity security operations center (SOC) caseload history;

generate an analyst threat response profile based on processing the SOC caseload history by a neural network, wherein the neural network is trained to triage results from the SOC caseload history to generate the analyst threat response profile, wherein the neural network comprises:

a plurality of neurons organized in a plurality of layers and that are coupled to one or more signals and one or more weights, wherein each neuron of the plurality of neurons is trained based on the SOC caseload history, previous cybersecurity threats, and responses to the previous cybersecurity threats;

augment the analyst threat response profile with threat response resolution metrics to generate an augmented threat response profile, wherein the response resolution metrics compromise an analyst closure response time;

detect, in a cybersecurity network, a new cybersecurity threat automatically counteract the new cybersecurity threat based on blocking an intrusion into the cybersecurity network;

identify a specific analyst based on providing data about the new cybersecurity threat, the automatic counteracting, and the augmented analyst threat response profile as input to the neural network;

assign the new cybersecurity threat to the identified specific analyst for cybersecurity response triage and incident lifetime management; and continuously adapt the neural network by adjusting the one or more weights of the plurality of neurons based on data associated with subsequent cybersecurity threats and corresponding computer-automated counteracting measures.

20. The computer program product of claim 18 wherein the assigning is further based on a weighting of threat severity, threat complexity, and analyst availability.

21. The computer program product of claim 18 further comprising developing, based on applying the neural network, a pedagogy plan for one or more analysts, within a cohort of analysts staffing the SOC, further based on the analyst threat response profile that was augmented.

22. The computer system of claim 19 wherein the assigning is further based on a weighting of threat severity, threat complexity, and analyst availability.

23. The computer system of claim 19 wherein the one or more processors are further configured to develop, based on applying the neural network, a pedagogy plan for one or more analysts, within a cohort of analysts staffing the SOC, further based on the analyst threat response profile that was augmented.

24. The computer system of claim 19 wherein the accessing, the generating, the augmenting, the detecting, the automatically counteracting, the identifying, and the assigning are converted to machine learning training data for continuously adapting the neural network.

* * * * *